United States Patent

[11] 3,564,286

[72] Inventors Tibor Rubner
 Pittsburgh;
 John H. Bednarek, Murrysville, Pa.
[21] Appl. No. 695,026
[22] Filed Jan. 2, 1968
[45] Patented Feb. 16, 1971
[73] Assignee Westinghouse Electric Corporation
 Pittsburgh, Pa.

[54] SOLID STATE VOLTAGE MATCHER AND VOLTAGE DIFFERENCE DETECTOR FOR USE THEREIN
 7 Claims, 2 Drawing Figs.
[52] U.S. Cl. .................................................. 307/235,
 307/87; 322/28, 322/36; 328/149; 317/148.5
[51] Int. Cl. .................................................. H03k 5/20
[50] Field of Search.......................................... 307/235,
 85—87; 328/146—150, 158, 159; 322/28, 36

[56] References Cited
 UNITED STATES PATENTS
 2,454,807 11/1948 Kennedy ...................... 328/149X
 3,328,599 6/1967 Stupar......................... 328/146X Primary Examiner—Donald D. Forrer
Assistant Examiner—John Zazworsky
Attorneys—A. T. Stratton, Clement L. McHale and M. I. Hull ABSTRACT: Two direct current difference voltages, of opposite polarity, are obtained, one by subtracting a voltage corresponding to the bus from a voltage corresponding to the generator, and the other by subtracting a voltage corresponding to the generator from a voltage corresponding to the bus, and are applied to the bases of separate transistors both of which, together with a third transistor, comprise a two-input-level detector. If the bus voltage is greater than the generator voltage by an amount which is greater than an adjustable threshold level established by varying the setting of a potentiometer arm connected to the base of the third transistor, an output is applied to a first AND circuit. If the generator voltage is greater than the bus voltage by an amount which is greater than the threshold level, an output is applied to a second AND circuit. A timer connected to both AND circuits supplies a pulse of adjustable width and predetermined repetition rate to both AND circuits simultaneously; the AND circuit which has an additional input thereto in accordance with the relative magnitudes of the bus and generator voltages supplies a pulse signal to an output transistor which energizes a relay winding. The two output transistors supplied from the two AND circuits respectively energize relay windings to supply "raise volts" and "lower volts" pulses to a motor-driven voltage-adjusting rheostat operatively connected to the generator.

3,564,286

SOLID STATE VOLTAGE MATCHER AND VOLTAGE DIFFERENCE DETECTOR FOR USE THEREIN

CROSS REFERENCE TO RELATED APPLICATIONS

This application is related to the copending application of Tibor Rubner for "voltage Acceptor Circuit and Overvoltage-Undervoltage Detector for Use Therein", Ser. No. 695,020, filed Jan. 2, 1968; to the copending application of Francis T. Thompson et al. for "Generator Speed Matcher Using Direct Sampling," Ser. No. 695,021, filed Jan. 2, 1968; and to the copending application of Tibor Rubner et al. for "Automatic Generator Synchronizing and Connecting System and Synchronizer Apparatus for Use Therein." Ser. No. 695,684, filed Jan. 4, 1968, all of the copending applications being assigned to the assignee of this invention.

BACKGROUND OF THE INVENTION

1. Field of the Invention

The invention relates to apparatus for bringing the voltage of an oncoming generator within a selected voltage difference from an energized bus.

2. Description of the Prior Art

Some prior art devices measure voltage difference without regard to the direction of the difference, by rectifying and filtering each voltage separately and then subtracting one from the other. The difference is then measured and, if excessive, is used to prevent synchronization. Such a device is described in an article by G. W. Pickard and J. Holden, entitled "Static Check Synchronizers," AEI Engineering, Vol. 7, Number 2, 1967.

Another prior art device develops a voltage proportional to the difference between generator and bus by similar means and senses the direction of the difference by electromechanical means.

SUMMARY OF THE INVENTION

Signals are available to two transistors selectively in accordance with whether the bus voltage exceeds the generator voltage by more than a selected amount, or whether the generator voltage exceeds the bus voltage by more than said selected amount, and are applied to the two output transistors through two AND circuits both of which have applied thereto simultaneously as the second input a pulse obtained from a timer. The output transistor which is selectively rendered conductive by a signal thereto energizes a relay winding to supply a "raise voltage" or "lower voltage" control pulse for the generator.

The difference signals are provided by a novel circuit combination that includes a two-input-level detector including three transistors, one of which has an adjustable base voltage to vary the threshold level from a value between 1 and 5 volts to thereby adjust voltage-matching accuracy, and give a permissive signal to the synchronizer when the required accuracy is reached.

The pulse from the timer may be adjusted in duration from, for example, 0.25 seconds to 2.0 seconds.

DESCRIPTION OF THE PREFERRED EMBODIMENT

Figure 1:
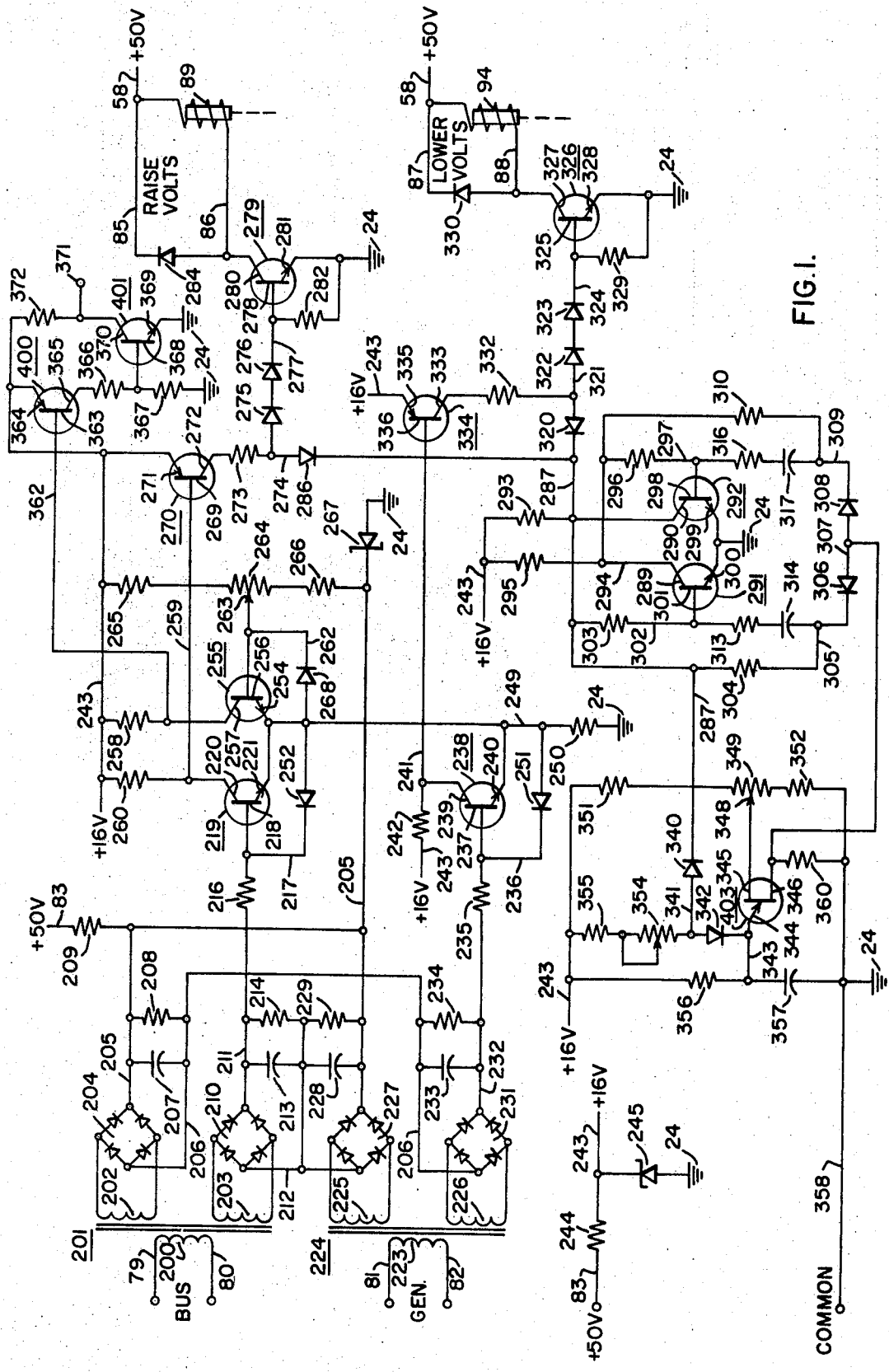
FIG. 1 is a schematic electrical circuit diagram according to the preferred embodiment of our invention.

Particular reference is made now to FIG. 1, a schematic electrical circuit diagram of the voltage matcher. The leads 79 and 80 connected to the bus energize the primary 200 of a transformer generally designated 201 having secondaries 202 and 203. The terminals of secondary 202 are connected to the input terminals of a full-wave rectifier 204 developing its output across leads 205 and 206, having capacitor 207 and resistance 208 connected thereacross, lead 205 being further connected by way of resistor 209 to positive supply lead 83.

Secondary 203 has the terminals thereof connected to full-wave rectifier 210 developing its output across leads 211 and 212, leads 211 and 212 having capacitor 213 and resistance 214 connected thereacross, lead 211 being further connected by way of resistor 216 and lead 217 to the base 218 of a transistor generally designated 219 having collector 220 and emitter 221.

The leads 81 and 82 to the generator energize the primary 223 of a transformer generally designated 224 having secondaries 225 and 226. Secondary 225 supplies an input to a full-wave rectifier 227 which develops its output between lead 205 and lead 212, leads 205 and 212 having capacitor 228 and resistor 229 connected therebetween. The aforementioned secondary 226 supplies an input to a full-wave rectifier 231 which develops its output across lead 232 and the aforementioned lead 206, leads 232 and 206 having capacitor 233 and resistor 234 connected therebetween, lead 232 being further connected by way of resistor 235 and lead 236 to the base 237 of an additional transistor 238 having collector 239 and emitter 240. Collector 239 is connected by way of lead 241 and resistor 242 to a +16 volt power supply lead 243, the 16volts being obtained from the 50 volt supply of lead 83 by the resistor-Zener diode combination 244 and 245 respectively.

The aforementioned emitter 240 of transistor 238 is connected by way of lead 249 and resistor 250 to ground 24, lead 249 being connected by way of diode 251 to lead 236, lead 249 being directly connected to the aforementioned emitter 221 of transistor 219, diode 252 being connected between lead 249 and lead 217.

The aforementioned emitter 21 of transistor 219 and lead 249 are directly connected to the emitter 254 of an additional transistor generally designated 255 having a base 256 and a collector 257, collector 257 being connected by way of resistor 258 to the aforementioned 16 volt power supply lead 243, the collector 220 of transistor 219 being also connected by way of lead 259 and resistor 260 to 16 volt supply lead 243. The aforementioned base 256 of transistor 255 is connected by way of lead 262 to the arm 263 of a potentiometer 264 forming part of a voltage dividing network including resistor 265 connected to 16 volt lead 243 and resistor 266 connected to the aforementioned lead 205, and further connected by way of Zener diode 267 to ground 24. Lead 262 is connected by way of diode 268 to lead 249.

Aforementioned collector 257 is connected by lead 362 to base 363 of transistor 400 having emitter 364 connected to lead 243 and collector 365 connected by way of resistors 366 and 367 to ground. The junction between resistors 366 and 367 is connected to base 368 of transistor 401 having an emitter 369 connected to ground and having a collector 370 connected to terminal 371 and by way of resistor 372 to lead 243.

The aforemention lead 259 connected to the collector 220 of transistor 219 is connected to the base 269 of a further transistor 270 having an emitter 271 connected to lead 243, and having a collector 272. Collector 272 is connected by way of resistor 273, lead 274, diodes 275 and 276, and lead 277 to the base 278 of an additional transistor 279 having a collector 280 and emitter 281. Emitter 281 is directly connected to ground 24 and resistor 282 is connected from the emitter 281 to the base 278.

The aforementioned collector 280 has a direct current energizing potential applied thereto by way of lead 86, relay winding 89 and lead 58 which is at +50 volts. The diode 284 limits inductive flyback when the circuit is opened.

For reasons to be set forth more clearly hereinafter, lead 274 is connected by way of diode 286 to lead 287. Lead 287 is directly connected to the collector 290 of transistor 292, and lead 287 is further connected by way of resistor 293 to 16 volt supply lead 243. The collector 289 of transistor 291 is connected by way of lead 294 and resistor 295 to said 16 volt supply lead 243. Lead 294 is connected by way of resistor 296 and lead 297 to the base 298 of the transistor 292, the emitter 299 thereof being connected to ground 24. The aforementioned transistor 291 has the emitter 300 thereof connected to ground 24 and has the base 301 thereof connected by way of lead 302 and resistor 303 to lead 287. Lead 287 is connected by way of resistor 304, lead 305, diode 306, lead 307, diode 308, lead 309, and resistor 310 to the aforementioned lead 294. The aforementioned lead 302 connected to base 301 of transistor 291 is connected by way of series-connected resistor 313 and capacitor 314 to the aforemention lead 305. The aforementioned base 298 of transistor 292 and lead 297 connected thereto are connected by way of series connected resistor 316 and capacitor 317 to aforementioned lead 309.

The aforementioned lead 287 is connected by way of diode 320, lead 321, diodes 322 and 323, and lead 324 to the base 325 of an additional output transistor 326 having a collector 327 and an emitter 328. The emitter 328 is connected to ground 24 which has resistor 329 connected therefrom to base 325. Collector 327 is connected to lead 88 and by way of diode 330 to lead 87. An energizing potential is applied by way of +50 volt lead 58 and the relay winding 94 to lead 88 and thence to collector 327. A relay arrangement not shown for convenience of illustration in FIG. 1 but shown in FIG. 2, insures that the transistors 326 and 279 do not have an energizing supply voltage applied to both of them at the same time. When one transistor has a voltage applied to the collector thereof, the other transistor is not energized because of the arrangement of the relays, armatures and contacts thereof, FIG. 2.

Lead 321 is connected by way of resistor 332 to the collector 333 of an additional transistor generally designated 334 having an emitter 335 connected to 16volt supply lead 243 and having a base 336 connected to lead 241 and thence to collector 239 of transistor 238.

The aforementioned lead 287 is connected by way of diode 340, lead 341, diode 342 and lead 343 to the emitter 344 of a unijunction transistor 403 having bases 345 and 346. Base 345 is connected to the arm 348 of a potentiometer 349 forming part of a voltage dividing network between a 16 volt power supply lead 243 and ground 24, potentiometer 349 having resistors 351 and 352 connected in series therewith.

The aforementioned lead 341 is connected by way of variable resistor 354 and resistor 355 to 16 bolt supply lead 243. The aforementioned lead 343 connected to emitter 344 is connected by way of resistor 356 to lead 243 and is connected by way of capacitor 357 to lead 358 and ground 24. The aforementioned base 346 of the unijunction transistor 403 is connected to lead 307 and is further connected by way of resistor 360 to lead 358.

The voltage matcher is seen to have two important controls. One of these is a voltage accuracy control, which controls the threshold, and which may be calibrated for a full scale value of, for example, 1 to 5 volts, and may correspond to potentiometer 264. The other is a pulse duration control which may produce a pulse the duration of which is variable from 0.25 seconds to 2 seconds, the scale of the control being calibrated in these values. This control may correspond to potentiometer 354.

Generally speaking a pulse-and-wait regulator is built into the voltage matcher to automatically manipulate the motor-driven voltage-adjusting rheostat of the oncoming generator, as will be seen more fully hereinafter. As will be seen more clearly hereinafter, a pulse, with an adjustable duration of 0.25 to 2.0 seconds, and a fixed wait time, which may be of the order to 6 seconds, is delivered to the "raise" or "lower" circuit of the voltage-adjusting rheostat until the voltage of the oncoming circuit is within the set point selected on the voltage matcher, which set point as previously stated may be adjustable from 1 to 5 volts. When the voltages are this close together, the voltages fall within the dead band of the voltage matcher and its regulating action on the voltage-adjusting rheostat stops, giving the synchronizer a release signal.

Figure 2:
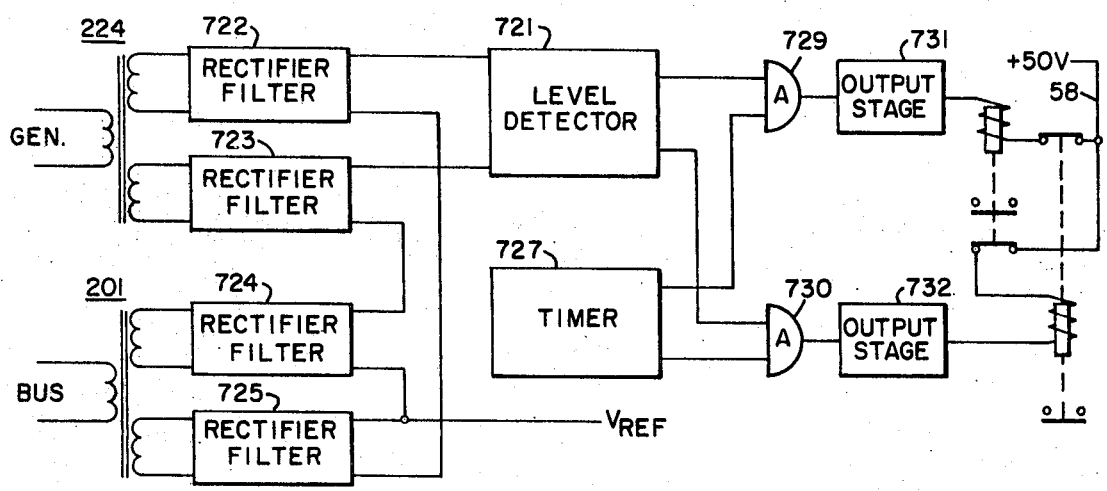
FIG. 2 is a block diagram of the apparatus of FIG. 1.

Summarizing the operation of the apparatus shown in schematic circuit diagram in FIG. 1 and in blocks in FIG. 2, the bus and generator voltages obtained from the potential transformers are fed to transformers 201 and 224, respectively. Transformer 201 has secondary windings 202 and 203 having equal turns ratios and transformer 224 has secondary windings 225 and 226 having equal turns ratios. All secondary voltages are full wave rectified and filtered. The outputs of the four filters are connected to obtain two difference voltages. One is obtained by subtracting the DC voltage corresponding to the bus from the DC voltage that corresponds to the generator, and the other is obtained by subtracting the DC voltage corresponding to the generator from the DC voltage that corresponds to the bus. Thus, when the voltage difference appearing at the base 218 of transistor 219 is positive with respect to the reference voltage obtained at the junction of resistor 266 and Zener diode 267, the voltage difference that appears at the base 237 of transistor 238 is of the same magnitude but of negative polarity, and vice versa. The difference voltage at the base 218 of transistor 219 is positive when the bus voltage is greater than the generator voltage, and it is negative when the bus voltage is lower than the generator voltage.

The difference voltages of opposite polarities are thus fed to a two-input-level detector including transistors 219, 255 and 238 and associated circuitry. The threshold level of the level detector is established by means of potentiometer 264 (voltage accuracy control). If the bus voltage is greater than the generator voltage by an amount which is greater than the threshold level, transistor 219, and therefore, transistor 270 conduct, while transistors 255 (and therefore transistors 400 and 401) and transistor 238 (and therefore transistor 334) are blocked. If the generator voltage is higher than the bus voltage by an amount that exceeds the established threshold, transistor 238 and transistor 334 conduct, while transistors 219, 255, 270, 400 and 401 are blocked. If the difference between the generator and bus voltages is less than the threshold level, transistor 255, and therefore transistors 400 and 401 conduct while transistors 219, 270, 238 and 334 are blocked. A ground level signal is thus given to the synchronizer by transistor 401 and if other conditions are correct, synchronization can occur, and at the same time voltage matching action stops.

THere are two output amplifiers which drive the output relays. One output amplifier includes transistor 279 and associated circuitry and it is connected to transistor 270 and to the timer which includes the unijunction transistor 403 and transistors 291 and 292. Thus when the bus voltage is greater than the generator voltage by an amount which exceeds the threshold set by potentiometer 264, and, as previously explained, transistor 270 conducts, output transistor 279 will also conduct at certain intervals for a predetermined duration thus giving "raise" pulses by way of a relay which may be connected between terminals 85 and 86.

The other output amplifier includes transistor 326 and associated circuitry and it is connected to transistor 334 by way of resistor 332 and to the timer in a manner similar to that heretofore described. Thus, when the generator voltage exceeds the bus voltage by an amount greater than the threshold set by potentiometer 264, transistor 326 gives "lower" pulses by way of a relay that may be connected between terminals 87 and 88.

The timer operates in the following manner: Assume that initially transistor 291 is blocked and transistor 292 conducts, diode 340 is then forward biased and diode 342 is reverse biased. Capacitor 357 charges through resistor 356, producing a certain waiting period, which may be 6seconds. At the end of the waiting period unijunction transistor 403 breaks down and couples a pulse to the triggered bistable circuit consisting of transistors 291 and 292 and associated circuitry. The bistable circuit changes state, so that now transistor 291 conducts and transistor 292 blocks. Diode 340 is now reverse biased allowing diode 342 to be forward biased, and capacitor 357 now charges through the series combination of resistor 355 and potentiometer 354 in addition to resistor 356, breaking down unijunction transistor 403 at the end of an adjustable timing period. This time corresponds to the "on" time of the output transistors. At the end of the timing period the bistable circuit changes state and the timing cycle repeats.

The aforegoing written description and the drawings are illustrated and exemplary only and are not to be interpreted in a limiting sense.

We claim:

1. In voltage-matching apparatus, in combination, means for obtaining two difference voltages of opposite polarities representing respectively a first voltage minus a second voltage and the second voltage minus the first voltage, level detector means operatively connected to the means for obtaining two difference voltages, said level detector means utilizing the difference voltages for selectively producing a first output when said first voltage exceeds the second voltage by at least a predetermined amount and selectively producing a second output when said second voltage exceeds said first voltage by at least said predetermined amount, a first AND circuit having said first output applied thereto as one input, a second AND circuit having said second output applied thereto as one input, and timer pulse producing means operatively connected to both the first and second AND Circuits and simultaneously supplying a second input to both said AND circuits.

2. Apparatus according to claim 1 including in addition first and second output pulse-producing means connected to the first and second AND circuits respectively for producing "raise voltage" and "lower voltage" control signals respectively while the first and second outputs of the level detector means are selectively applied to the first and second AND circuits coincidentally with the application thereto of pulses from the timer pulse producing means.

3. Apparatus according to claim 1 in which the timer pulse-producing means includes a circuit portion having a capacitor therein chargeable in predetermined times through two circuit paths, charging the capacitor through one path controlling the pulse repetition rate, charging the capacitor through the other path controlling the pulse width, the timer pulse-producing means including an additional circuit portion having therein a triggered bistable device operatively connected to said capacitor, the triggered bistable device in one state selecting one charging path and in the other state selecting the other charging path.

4. Apparatus according to claim 1 in which the means for obtaining two difference voltages includes two transformers each having two secondary windings, and a plurality of rectifier and filter means for separately obtaining a direct current signal from each of the secondary windings.

5. In voltage matching apparatus, in combination, means for obtaining two equal difference voltages of opposite polarities representing respectively a first voltage minus a second voltage and the second voltage minus the first voltage, a two-input-level detector circuit means including three transistors, the circuit means including means for adjusting the voltage on the vase of one transistor to establish a selected voltage accuracy limit whereby the level detector circuit means produces an output only when the difference voltage is greater than a selected permissible voltage, first output circuit means and second output circuit means both operatively connected to the two-input-level detector circuit means, the two-input-level detector circuit means being constructed and arranged to utilize the two difference voltages to selectively produce a first output and supply said first output to the first output circuit means when said first voltage exceeds the second voltage by at least a predetermined amount and one which is greater than the permissible voltage and to selectively produce a second output and supply said second output to said second output circuit means when said second voltage exceeds the first voltage by at least a predetermined amount and one which is greater than the permissible voltage.

6. Apparatus according to claim 5 in which the first voltage corresponds to the voltage on an energized bus and the second voltage corresponds to the voltage of a generator to corresponds connected to the bus when the difference between the first and second voltages is within permissible limits as defined by said selected voltage accuracy limit, wherein the first output circuit means includes an AND circuit having the first output of the level detector circuit means applied thereto as one input, wherein the second output circuit means includes and additional AND circuit having the second output of the level detector circuit means applied thereto as one input, a pulse generator having means for adjusting the duration of the pulses generated therein and a predetermined wait time between pulses operatively connected to the AND circuit and to the additional AND circuit and supplying the pulses generated therein to both AND circuits simultaneously as a second input to both AND circuits, said AND circuit producing an output control signal when the first output of the level detector circuit means is applied thereto coincident with the application thereto of a pulse from the pulse generator means, said additional AND circuit producing an additional output control signal when the second output of the level detector circuit means is applied thereto coincident with the application thereto of a pulse from the pulse generator means.

7. Apparatus according to claim 6 including in addition fourth and fifth transistors, first and second relays, and circuit means interconnecting the fourth and fifth transistors and the first and second relays, the last-named circuit means being adapted to be connected to a source of energizing potential for the fourth and fifth transistors and being constructed and arranged whereby selective operation of the relays insure that the source of potential is connected at any time to only one fourth and fifth transistors, the last-named circuit means connecting the fourth and fifth transistors to the AND circuit and to the additional AND circuit whereby the output control signal and the additional output control signal are applied as inputs to the fourth and fifth transistors respectively.